United States Patent
Yao et al.

(10) Patent No.: US 11,025,116 B2
(45) Date of Patent: Jun. 1, 2021

(54) CENTRIFUGAL FLUID-COOLED AXIAL FLUX MOTOR

(71) Applicant: GM Global Technology Operations LLC, Detroit, MI (US)

(72) Inventors: Jian Yao, Shanghai (CN); Yusheng Zou, Northville, MI (US); Chengwu Duan, Shanghai (CN); Zhen Gao, Shanghai (CN); Lei Hao, Troy, MI (US); Alireza Fatemi, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 46 days.

(21) Appl. No.: 16/426,797

(22) Filed: May 30, 2019

(65) Prior Publication Data
US 2020/0274410 A1    Aug. 27, 2020

(30) Foreign Application Priority Data

Feb. 22, 2019   (CN) .......................... 201910133592.7

(51) Int. Cl.
| H02K 1/32 | (2006.01) |
|---|---|
| H02K 21/24 | (2006.01) |
| H02K 9/197 | (2006.01) |
| H02K 16/02 | (2006.01) |
| H02K 9/19 | (2006.01) |
| H02K 16/00 | (2006.01) |
| H02K 5/20 | (2006.01) |
| H02K 1/20 | (2006.01) |
| H02K 1/27 | (2006.01) |

(52) U.S. Cl.
CPC ............... *H02K 1/32* (2013.01); *H02K 9/197* (2013.01); *H02K 21/24* (2013.01)

(58) Field of Classification Search
CPC .......... H02K 1/32; H02K 9/197; H02K 21/24; H02K 9/19; H02K 5/20; H02K 1/20
USPC ............... 310/54, 60 A, 266, 267, 268, 60 R
See application file for complete search history.

(56) References Cited

U.S. PATENT DOCUMENTS

| 8,916,997 | B2 * | 12/2014 | Kirkley, Jr. | .............. H02K 5/20 310/54 |
| 2008/0100174 | A1 * | 5/2008 | Stahlhut | .................... H02K 1/20 310/268 |
| 2018/0145574 | A1 * | 5/2018 | McCaw | .................. H02K 21/24 |
| 2019/0074742 | A1 * | 3/2019 | Matsumoto | .............. H02K 9/19 |

* cited by examiner

Primary Examiner — Tulsidas C Patel
(74) Attorney, Agent, or Firm — Vivacqua Crane

(57) ABSTRACT

A fluid-cooled axial flux motor having a stator, a rotor disposed adjacent to the stator, and a rotor shaft rotationally fixed onto the rotor. The rotor shaft includes axial coolant passageway having an inlet and opposite outlet. The rotor includes coolant passageways extending radially from rotor shaft. The rotor coolant passageways include an inlet in fluid communication with the outlet of the axial coolant passageway and an outlet. The fluid-cooled axial flux motor further includes a coolant distribution header having an inlet in fluid communication with the outlet of the rotor coolant passageway, a coolant collection header having an inlet in fluid communication with the outlet of the coolant distribution header, and a collection header outlet. The outlet of the coolant distribution header is disposed above the stator and the inlet of the coolant collection header is disposed below the stator with respect to the direction of gravity.

15 Claims, 5 Drawing Sheets

CENTRIFUGAL FLUID-COOLED AXIAL FLUX MOTOR

INTRODUCTION

The present disclosure relates to axial flux motors; more specifically to fluid-cooled axial flux motors.

Electric motors utilize the principle of electromagnetic interactions of magnetic fields generated by coils and magnets to transform electrical energy into mechanical energy. Electric motors typically include a stationary component, known as a stator, and a rotary component, known as a rotor. The rotor is separated from the stator by a small air gap and rotates relative to the fixed stator. A rotor shaft may be coupled to the rotor to transmit the rotational mechanical energy for beneficial use.

Depending on the relative position of the rotor to the stator, electric motors may be classified as a radial flux motor or an axial flux motor. In a radial flux motor, the magnetic flux generated by the interaction of the energized stator and rotor extends radial to the rotor shaft. In an axial flux motor, the magnetic flux extends parallel to the rotor shaft. In certain applications, axial flux motors are desirable due to its relatively lightweight, increased power, and compact size as compared to radial flux motors.

The operations of electric motors generate heat due to electrical resistance, iron losses, and mechanical frictions in the rotors and stators. The stators and rotors are typically cooled to avoid overheating, which would result in demagnetization of the magnets and/or heat damage to the stators, rotors, and other motor components. For radial flux motors, external liquid cooling jackets are used to dissipate heat from the motors. However, for axial flux motors, especially for axial flux motors having a stator stacked between two external rotors, external liquid cooling jackets may not be as efficient in dissipating heat without compromising the compact form factor of the axial flux motor. In which case, the axial flux motor relies on internal fan blades incorporated on the external surfaces of the rotors for air cooling. However, the motor efficiency is degraded due to windage loss resulting from air cooling.

Thus, while air cooled axial flux motors achieve their intended purpose, there is need for a liquid cooled axial flux motor that provides increased cooling efficiency while maintaining the desired compact form factor.

SUMMARY

According to several aspects, a fluid-cooled axial flux motor is disclosed. The fluid-cooled axial flux motor includes a stator, a rotor disposed adjacent the stator about a rotational axis and defining an air gap therebetween, and a rotor shaft extending along the rotational axis and rotationally fixed to the disk body. The rotor includes a disk having an interior face oriented toward the stator, an opposite exterior face, and a disk body therebetween. The rotor shaft includes an axial coolant passageway having an inlet port and an outlet port.

In an additional aspect of the present disclosure, the axial coolant passageway includes a closed end opposite the inlet port and the outlet port extends perpendicularly from the rotational axis In another aspect of the present disclosure, the disk includes a centrifugal coolant passageway extending through the disk body. The centrifugal coolant passageway includes an inlet and an opposite outlet. The outlet port of the axial coolant passageway is in fluid communication with the inlet of the centrifugal coolant passageway.

In another aspect of the present disclosure, the disk includes an interior circumferential surface defining the inlet of the centrifugal coolant passageway and an opposite exterior circumferential surface defining the outlet of the centrifugal coolant passageway. The interior circumferential surface cooperates with an exterior surface of the rotor shaft to define an annular coolant header in fluid communication with the outlet port of the axial coolant passageway and the inlet of the centrifugal coolant passageway.

In another aspect of the present disclosure, the centrifugal coolant passageway defines a spiral curve from the interior circumferential surface to the exterior circumferential surface of the disk.

In another aspect of the present disclosure, the disk body further includes a plurality of concentric coolant channels in fluid communication with the centrifugal coolant passageway.

In another aspect of the present disclosure, the fluid-cooled axial flux motor further includes a plurality of magnets affixed in a predetermined arrangement on the interior face of the disk and a dam in slidable engagement with the plurality of magnets such that the dam provides a fluid tight seal between the centrifugal coolant passageway and the stator. The centrifugal coolant passageway extends between an interface between the magnets and the interior face of the disk.

In another aspect of the present disclosure, the fluid-cooled axial flux motor further includes a motor housing containing the rotor and stator and a coolant distribution header. The coolant distribution header includes a distribution header inlet in fluid communication with the outlet of the centrifugal coolant passageway and a coolant distribution header outlet in fluid communication with the stator. The coolant distribution header is located at an upper portion of the motor housing with respect to the direction of gravity.

In another aspect of the present disclosure, the fluid-cooled axial flux motor further includes a coolant collection header having a collection header inlet in fluid communication with the stator and a collection header outlet. The coolant collection header is located at a lower portion of the motor housing with respect to the direction of gravity.

In another aspect of the present disclosure, the disk comprises a laminated metallic strip having predetermined apertures defining radial coolant passageway.

According to several aspects, a fluid-cooled axial flux motor is disclosed. The fluid-cooled axial flux motor includes a stator; a rotor disposed adjacent the stator about a rotational axis and defining an air gap therebetween, wherein the rotor comprises an annular disk having an interior face oriented toward the stator, an exterior face opposite the interior face, an interior circumferential surface, and an exterior circumferential surface opposite the interior circumferential surface; a plurality of magnets affixed in a predetermined arrangement on the interior face of the disk; and a rotor shaft extending along the rotational axis and rotationally fixed to the interior circumferential surface of the annular disk. The rotor shaft includes an axial coolant passageway having an inlet port, a closed end opposite the inlet port, and a plurality of outlet ports extending radially from the rotational axis.

In an additional aspect of the present disclosure, the rotor shaft includes an external shaft surface cooperating with the interior circumferential surface of the annular disk to define an annular coolant distribution header in fluid communication with the outlet ports of the axial coolant passageway.

In another aspect of the present disclosure, the rotor includes a first plurality of centrifugal coolant passageways extending through the annular disk between the interior circumferential surface and the exterior circumferential surface. At least one of the first plurality of centrifugal coolant passageways includes an inlet in fluid communication with the annular coolant distribution header.

In another aspect of the present disclosure, the rotor includes a second plurality of centrifugal coolant passageways extending through the annular disk between the interior circumferential surface and the exterior circumferential surface at the interface between the interior face of the disk and the plurality of magnets. At least one of the second plurality of centrifugal coolant passageways includes an inlet in fluid communication with the annular coolant distribution header.

In another aspect of the present disclosure, the fluid-cooled axial flux motor further includes a motor housing enclosing the rotor and stator and a coolant distribution header disposed adjacent to an upper portion of the motor housing with respect to the direction of gravity. The coolant distribution header includes an inlet in fluid communication with at least one of the first plurality of centrifugal coolant passageways and the second plurality of centrifugal coolant passageways, and an outlet in fluid communication with the stator.

In another aspect of the present disclosure, the fluid-cooled axial flux motor further includes a coolant collection header disposed adjacent to a lower portion of the motor housing with respect to the direction of gravity. The coolant collection header includes an inlet in fluid communication with the stator and an outlet.

In another aspect of the present disclosure, the first plurality of centrifugal coolant passageways defines a spiral curve from the interior circumferential surface to the exterior circumferential surface.

In another aspect of the present disclosure, the annular disk further includes a plurality of concentric coolant channels in fluid communication with at least one of the first plurality of centrifugal coolant passageways and the second plurality of centrifugal coolant passageways.

According to several aspects, a fluid-cooled axial flux motor is disclosed. The fluid-cooled axial flux motor includes a stator; a rotor disposed adjacent the stator about a rotational axis and rotatable with respect to the stator, wherein the rotor includes an interior face oriented toward the stator and a plurality of magnets affixed on the interior face; and a rotor shaft rotationally fixed onto the rotor; a axial coolant passageway having an inlet and an opposite outlet extending axially through the shaft; a rotor coolant passageway extending through the rotor radially from rotor shaft, wherein the rotor coolant passageway includes an inlet in fluid communication with the outlet of the axial coolant passageway, and an outlet; a coolant distribution header having an inlet in fluid communication with the outlet of the rotor coolant passageway, and an outlet; and a coolant collection header having an inlet in fluid communication with the outlet of the coolant distribution header, and a collection header outlet.

In an additional aspect of the present disclosure, the outlet of the coolant distribution header is disposed above the stator and the inlet of the coolant collection header is disposed below the stator with respect to the direction of gravity.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

Figure 1:
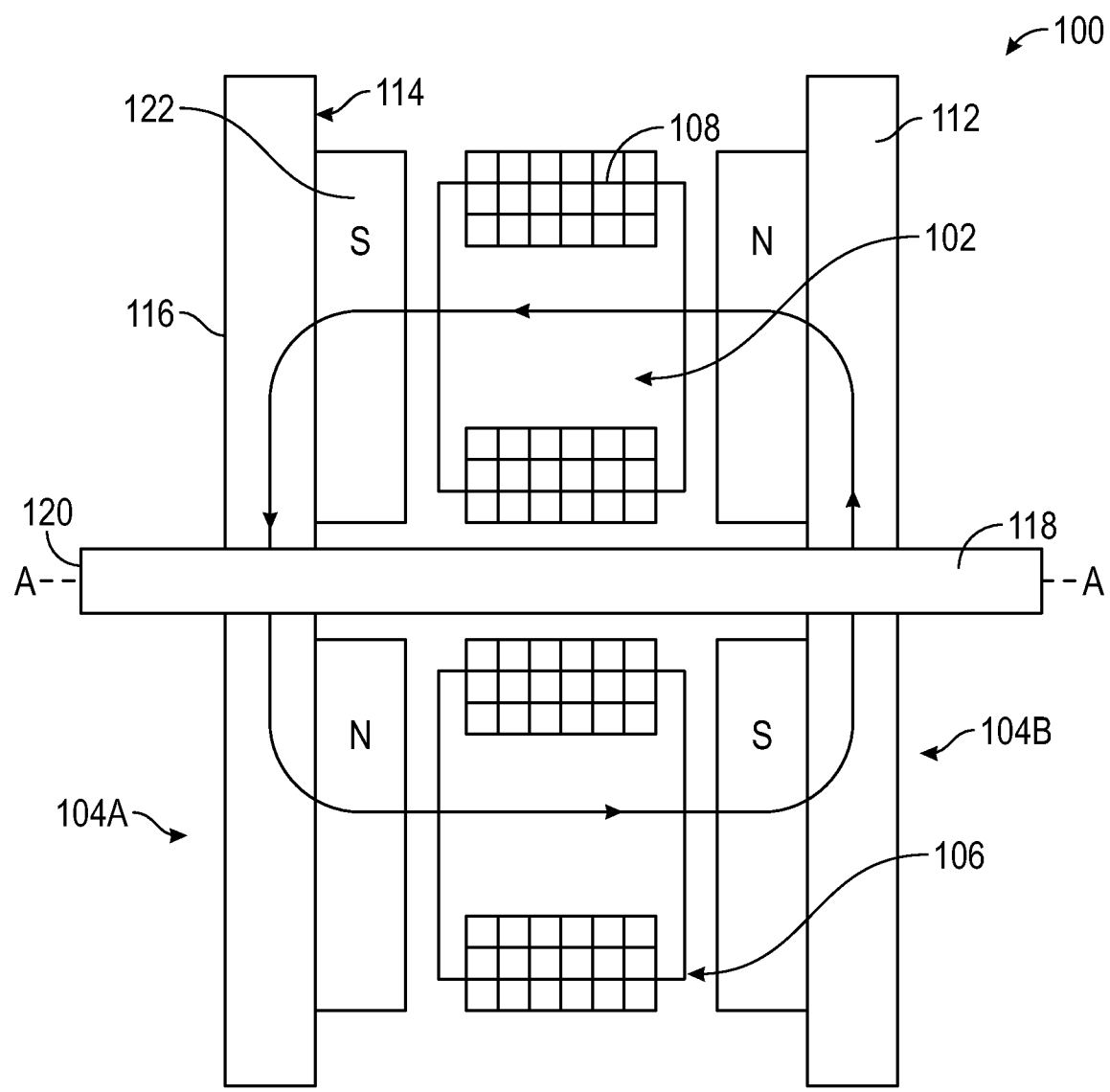
FIG. 1 is a schematic illustration of an axial flux motor having a stator stacked between two external rotors, according to an exemplary embodiment.

FIG. 1 shows a schematic illustration of an axial flux motor 100, also known as a pancake motor 100, having a single stator 102 and dual rotors 104A, 104B (collectively "rotors 104"). The axial flux motor 100 may be used in high torque applications such as for the propulsion of an electric or hybrid vehicle. The vehicle applications of the axial flux motor 100 is provided as an exemplary embodiment and is not intended to be limiting.

The stator 102 is stacked between a first rotor 104A and a second rotor 104B along a rotational axis-A. The rotors 104 are separated from the stator 102 by a small air gap 106 and rotate on the rotational axis-A relative to the fixed stator 102. It should be appreciated that while two rotors 104 are depicted, it is not intended for the axial flux motor 100 to be limited as such. The axial flux motor 100 may have one rotor and one stator, one rotor and two stators, and various combinations of multiple rotors and stators.

Each of the rotors 104 includes an annular disk 112 having an interior annular face 114 oriented toward the stator 102 and an opposite exterior annular face 116. A rotor shaft 118 is rotationally coupled to each of the rotors 104 such that the rotation of the rotors 104 causes the rotor shaft 118 to rotate and vice versa. The stator 102 includes a plurality of electrically conductive windings 108 operable to interact with the magnetic fields of a plurality permanent magnets 122 having alternating poles. The plurality of permanent magnets 122 are circumferentially positioned onto the interior annular face 114 of the annular disk 112 and affixed in position with a bonding adhesive. Different regions of the stator 102 may be selectively energized to impart a rotational force on the rotors 104 causing the rotors 104 and the rotationally coupled shaft 118 to spin on the rotational axis A.

Figure 2:
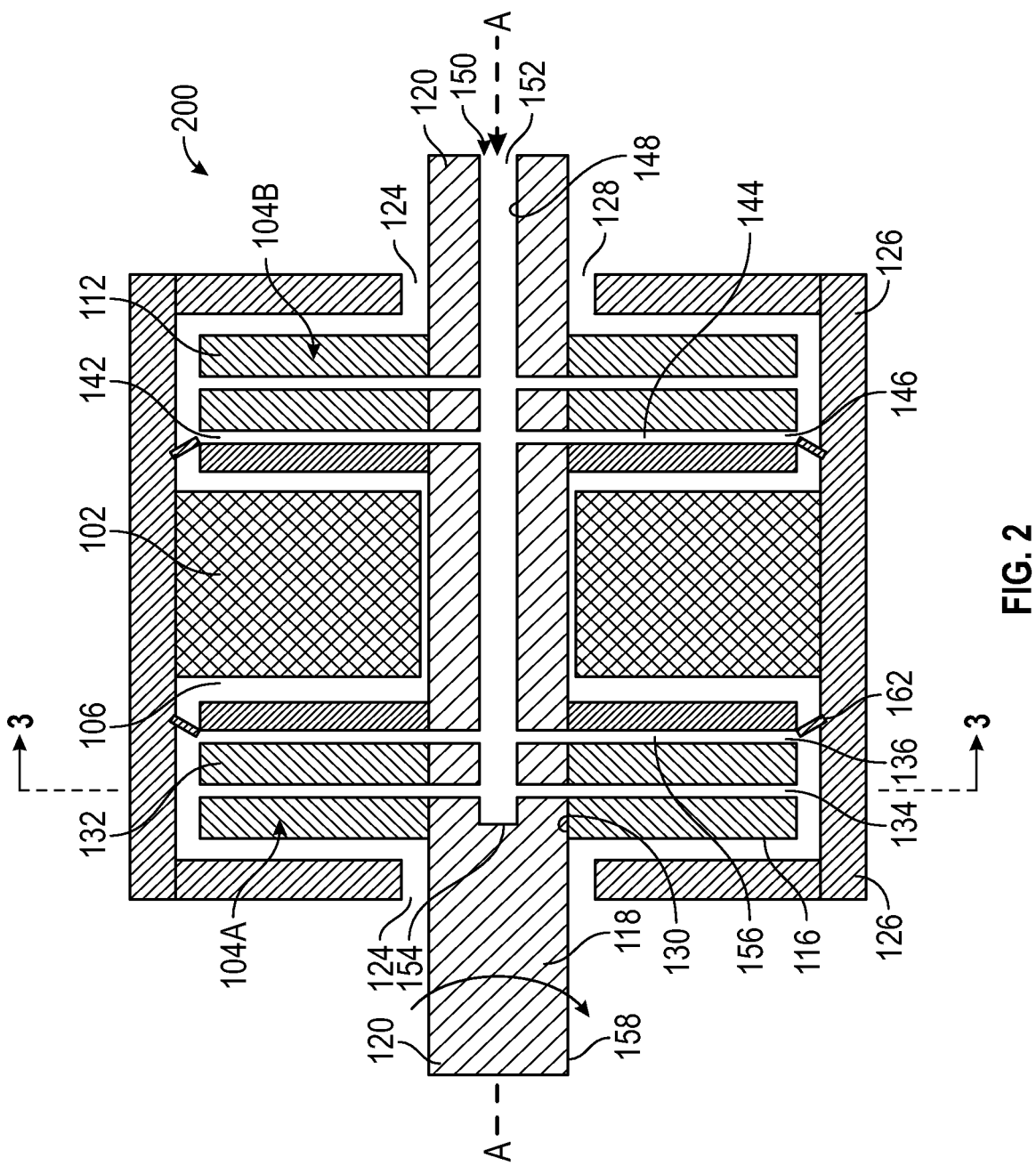
FIG. 2 is a schematic illustration of a cross-sectional view of a first embodiment of a liquid cooled axial flux motor.

FIG. 2 shows a schematic illustration of a cross-sectional view of a first embodiment of a liquid cooled axial flux motor (herein "liquid cooled axial flux motor 200"). The liquid cooled axial flux motor 200 includes a stator 102 stacked between a first rotor 104A and a second rotor 104B along a rotation axis-A. The rotors 104 are separated from the stator 102 by a small air gap 106 and rotates relative to the fixed stator 102. A rotor shaft 118 is rotationally coupled to each of the rotors 104 and extends through the stator 102. The rotor shaft 118 includes two opposite shaft ends 120. The shaft ends extend through opposite shaft openings 124 defined in the motor housing 126. The rotor shaft 118 is supported by bearings 128 that align the rotors 104 with respect to the stator 102 while allowing rotation of the rotor shaft 118.

Referring to FIGS. 2 and 3A-C, the annular disk 112 of each rotor includes an interior circumferential surface 130 facing the rotational axis A, an opposite exterior circumferential surface 132, a plurality of internal centrifugal coolant passageways 134, and a plurality of external centrifugal coolant passageways 136. At least one of the plurality of internal centrifugal coolant passageways 134 extends through the body of the annular disk 112 from the interior circumferential surface 130 to the exterior circumferential surface 132. The interior circumferential surface 130 defines an inlet 138 to the internal centrifugal coolant passageway 134 and the exterior circumferential surface 132 defines an outlet 140 from internal centrifugal coolant passageway 134. At least one of the plurality of external centrifugal coolant passageways 136 is defined on an interface 142 between the interior annular face 114 and the plurality of magnets 122, and extends from the interior circumferential surface 130 to the exterior circumferential surface 132. The interior circumferential surface 130 defines an inlet 144 to the external centrifugal coolant passageway 136 and the exterior circumferential surface 132 defines an outlet 146 from external centrifugal coolant passageway 136.

The rotor shaft 118 includes a bore surface 148 defining an axial coolant passageway 150 extending partially through the rotor shaft 118 along the axis-A. The axial coolant passageway 150 includes an inlet port 152 and a closed end 154 opposite the inlet port 152. The closed end 154 of the axial coolant passageway 150 is positioned proximal to the external surface 116 of the first rotor 104A. The axial coolant passageway 150 includes a plurality of radial outlet ports 156 in fluid communication with the plurality of internal and external centrifugal coolant passageways 134, 136. The interior circumferential surface 130 of the annular disk 112 cooperates with an exterior surface 158 of the rotor shaft 118 to define an annular coolant header 160 in fluid communication with the radial outlet ports 156 of the axial coolant passageway 150 and the internal and external centrifugal coolant passageways 134, 136. A dam gasket 162 is positioned in slidable engagement with the plurality of magnets 122 such that the dam gasket 162 provides a fluid tight seal between the internal and external centrifugal coolant passageways 134, 136 and the stator 102. The dam gasket 162 may be formed of a metallic material or a composite material that is sufficiently durable and compliant for the contact surfaces of the rotating rotor to slide against the dam while maintaining the fluid tight seal.

Figure 3C:
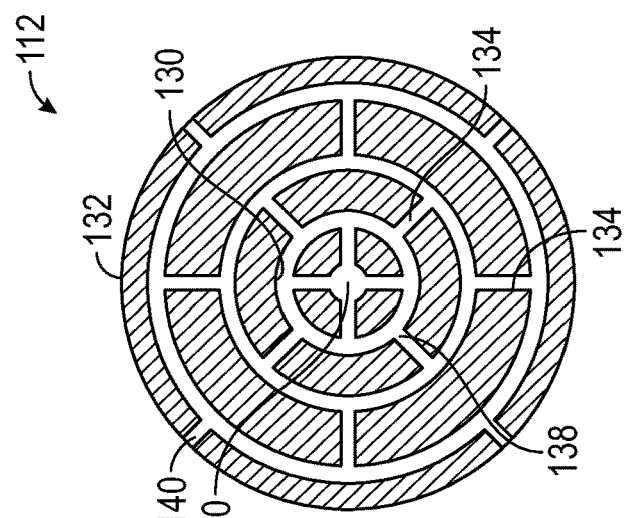
FIGS. 3A-3C are schematic illustrations of a cross-section of a liquid cooled rotor of FIG. 2 along line 3-3 showing alternative embodiments of centrifugal cooling passageways.
Figure 3B:
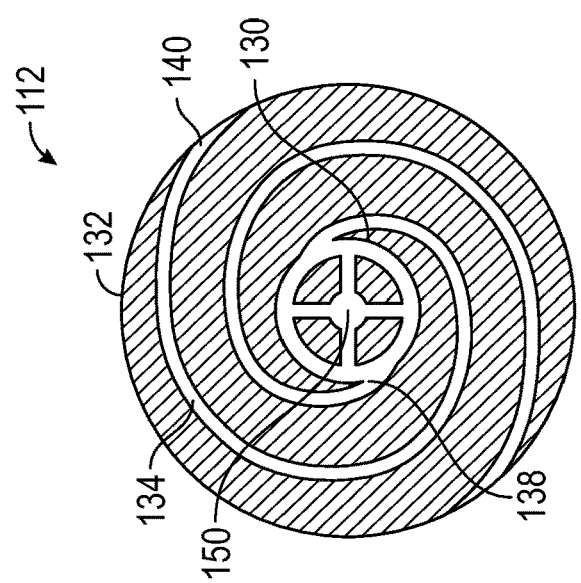
Figure 3A:
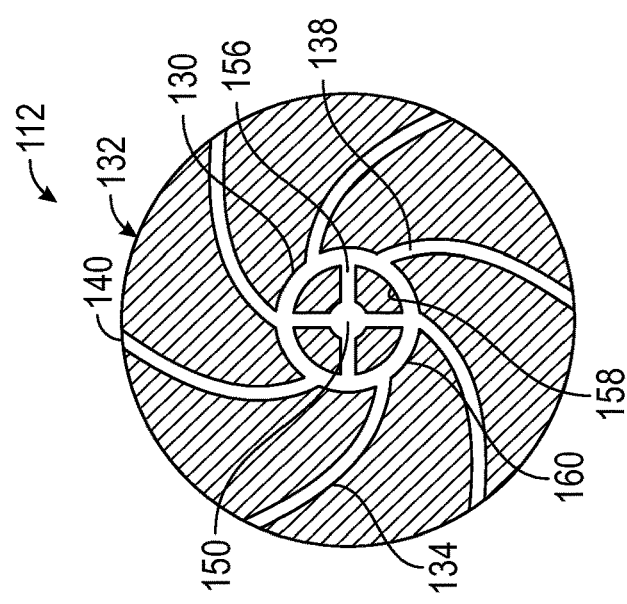

FIGS. 3A through 3C are schematic illustrations of a cross-section of the first rotor 104A of FIG. 2 along line 3-3 showing alternative embodiments of the plurality of the internal centrifugal coolant passageway 134. FIG. 3A through 3C shows a cross-section of the rotor shaft 118 having the axial coolant passageway 150 and a plurality of radial outlet ports 156 extending from the axial coolant passageway 150. The plurality of radial outlet ports 156 are in fluid communication with the annular coolant header 160, which is in fluid communication with the plurality of internal centrifugal coolant passageways 134. FIG. 3A shows the plurality of internal centrifugal coolant passageways 134 having a gentle spiral curved path and FIG. 3B shows the plurality of internal centrifugal coolant passageways 134 having an aggressive spiral curved path. FIG. 3C shows the body of the annular disk 112 having a plurality of concentric coolant channels 164 in fluid communication with a plurality of radially extending internal centrifugal coolant passageways 134.

Referring to FIGS. 2 and 3A-C, in operating mode, as the rotors 104 are rotating about the rotational axis-A, liquid coolant flows from the inlet port 152 of the axial coolant passageway 150, through axial coolant passageway 150 of the shaft 118, and exits the radial outlet ports 156 into the annular coolant header 160. From the annular coolant header 160, the coolant flows through the plurality of internal and external centrifugal coolant passageways 134, 136 and then exits through the outlets of the respective centrifugal coolant passageways 134, 136 and into the housing 126 where the coolant may be collected and circulated through an external heat exchanger (not shown) before being pumped to the inlet port 152 of the axial coolant passageway 150 to repeat the process. As the coolant is flowing through the internal and external centrifugal coolant passageways 134, 136, heat is transferred from the higher temperature rotors 104 to the lower temperature coolant thereby cooling the axial flux motor 200. The coolant may be that of a natural or synthetic mineral oil or a combination of water-glycol mixture.

Figure 4:
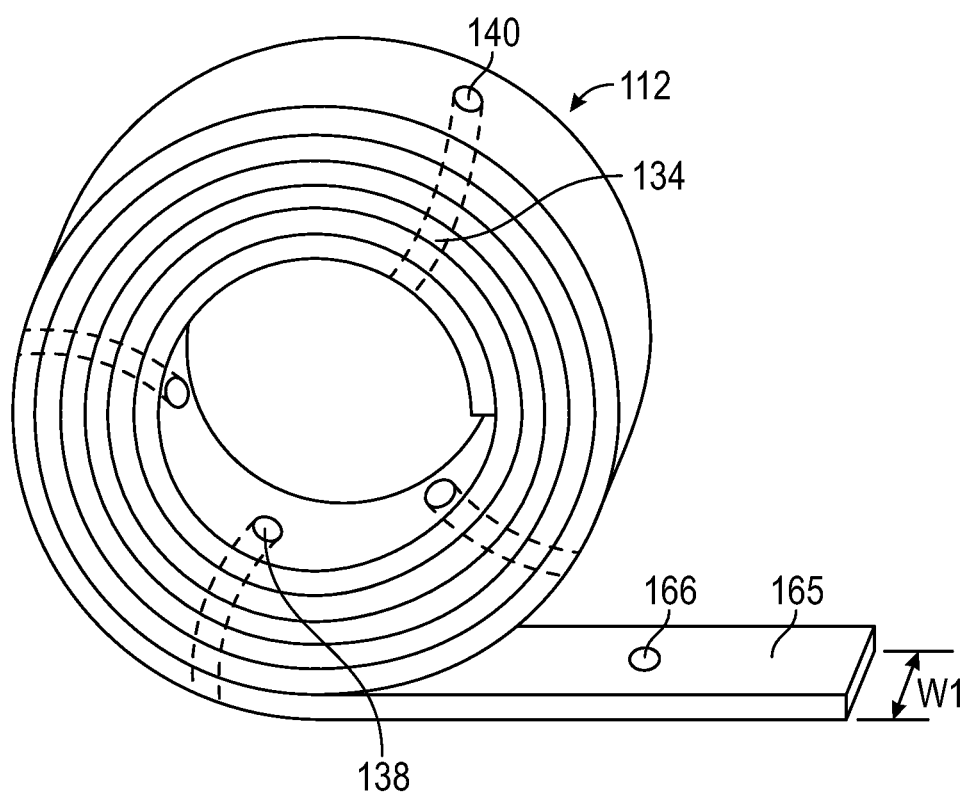
FIG. 4 is a diagrammatic side view of a partially completed laminated disk of the liquid cooled rotor of FIG. 3, according to an exemplary embodiment.

FIG. 4 shows a diagrammatic side view of a partially completed laminated annular disk 112 having a plurality of internal centrifugal coolant passageways 134 of FIG. 3A. The features of laminated annular disk 112 are exaggerated for illustrative purposes. The laminated annular disk 112 is formed of a metallic strip 165, preferably a silicon steel strip, having a thickness of approximately less than 0.3 mm thick and a predetermined width (W1). The predetermined width (W1) is the width of the external circumferential surface 132 along the axis-A. The metallic strip 165 is stacked by spirally coiling the metallic strip 165 to form the laminated annular disk 112. A plurality of apertures 166 having a predetermined shape and size are stamped out, cut out, or removed by any other means at predetermined locations along the metallic strip 165, such that when the metallic strip 165 is spirally coiled forming the laminated annular disk 112, the apertures 166 are aligned to define the internal centrifugal coolant passageways 134 and corresponding inlets and outlets.

In an alternative embodiment, the disk 112 may be manufactured of a non-conductive material such as a soft magnetic composite (SMC), which is a mixed powder having electrical insulating property, that is pressed in a die to form an annular disk shape or any other shapes depending on the forming die. The plurality of internal and external centrifugal coolant passageways 134, 136 of the annular disk 112 may be formed by any known means during the pressing process.

Figure 5:
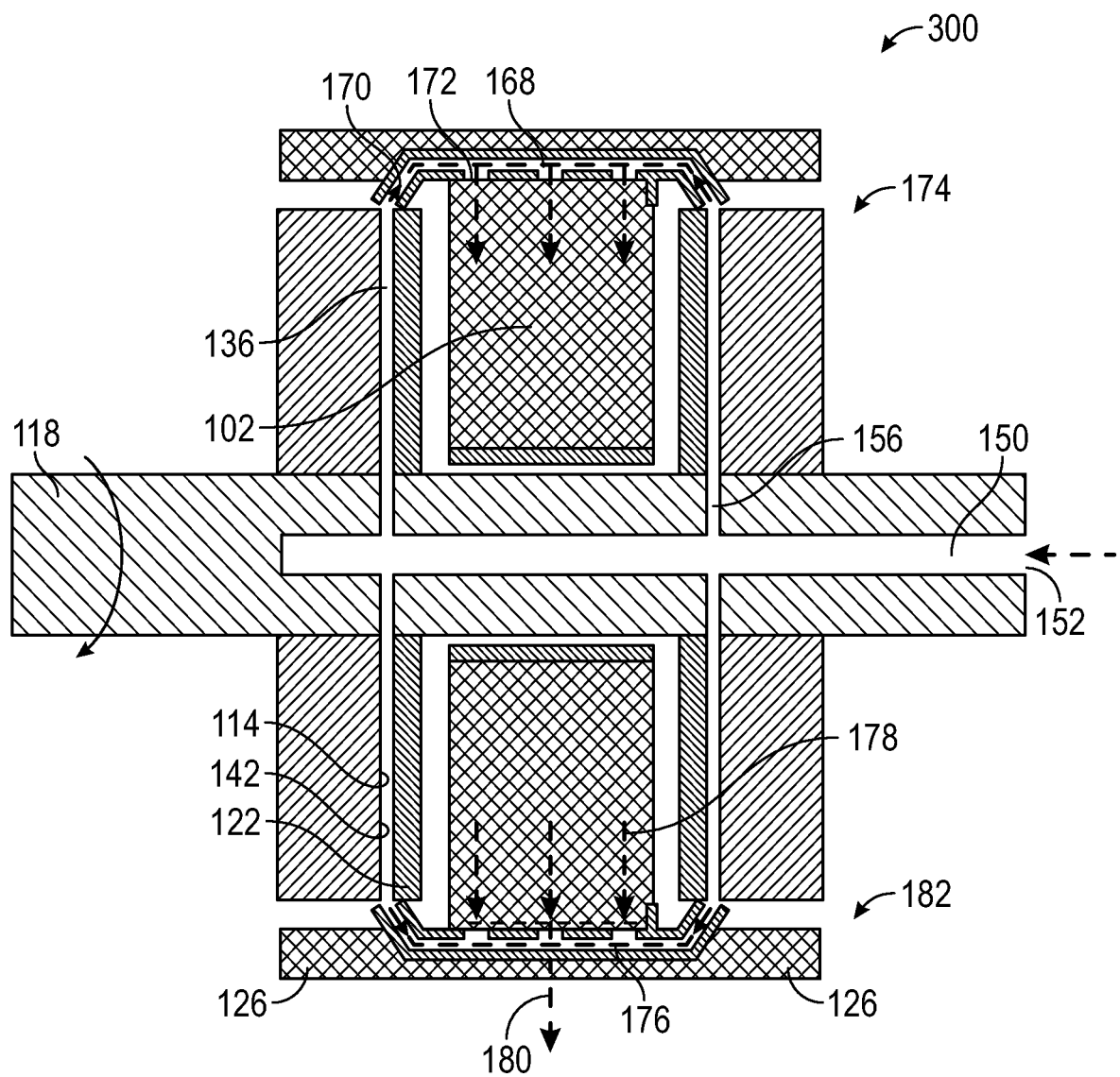
FIG. 5 is a schematic illustration of a cross-sectional view of a second embodiment of a liquid cooled axial flux motor.

FIG. 5 shows a schematic illustration of a cross-sectional view of a second embodiment of a liquid cooled axial flux motor (herein "liquid cooled axial flux motor 300"). Similar to the first embodiment of the liquid cooled axial flux motor 200, the liquid cooled axial flux motor 300 includes a plurality of external centrifugal coolant passageways 136 defined on the interface 142 between the interior annular face 114 and the plurality of magnets 122, extending from the interior circumferential surface 130 to the exterior circumferential surface 132 of the annular disk 112.

The liquid cooled axial flux motor 300 includes coolant distribution header 168 having a distribution header inlet 170 in fluid communication with an outlet 146 of at least one of the plurality of external centrifugal coolant passageways 136, and a distribution header outlet 172 in fluid communication with the stator 102. The coolant distribution header 168 is located at an upper portion 174 of the motor housing 126 with respect to the direction of gravity. The liquid cooled axial flux motor 300 also includes a coolant collection header 176 having a collection header inlet 178 in fluid communication with the stator 102 and a collection header outlet 180, wherein the coolant collection header 176 is located at a lower portion 182 of the motor housing 126 with respect to the direction of gravity.

In operating mode, as the rotors 104 are rotating about the rotational axis-A, liquid coolant flows from the inlet port 152 of the axial coolant passageway 150 and through axial coolant passageway 150 of the shaft 118, then exits the radial outlet ports 156 into the annular coolant header 160. From the annular coolant header 160, the coolant flows through the plurality of external centrifugal coolant passageways 136 and exits into the distribution header 168. From the distributor header 168, under the force of gravity, the coolant is distributed onto the end windings of the coils of the stator 102. The coolant is then collected by the collection header 176 and directed out of the housing 126 through the collection header outlet 180 defined in housing 126.

As the coolant is flowing through the external centrifugal coolant passageways 136 and windings of the stator 102, heat is transferred from the higher temperature rotors 104 and stator 102 to the lower temperature coolant thereby cooling the axial flux motor 300. The coolant may be that of a natural or synthetic mineral oil. While only the plurality of external centrifugal coolant passageways 136 are shown, the liquid cooled axial flux motor 300 may also include a plurality of internal centrifugal coolant passageways 134 as shown in the first embodiment of the axial flux motor 200.

The description of the present disclosure is merely exemplary in nature and variations that do not depart from the gist of the present disclosure are intended to be within the scope of the present disclosure. Such variations are not to be regarded as a departure from the spirit and scope of the present disclosure.

The invention claimed is:

1. A fluid-cooled axial flux motor, comprising:
a stator;
a rotor disposed adjacent the stator about a rotational axis, wherein the rotor comprises a disk having an interior face oriented toward the stator, an opposite exterior face, and a disk body therebetween; and
a rotor shaft extending along the rotational axis and rotationally fixed to the disk body, wherein the rotor shaft includes an axial coolant passageway having an inlet port and an outlet port;
wherein the disk includes a centrifugal coolant passageway extending through the disk body, wherein the centrifugal coolant passageway includes an inlet and an opposite outlet and the outlet port of the axial coolant passageway is in fluid communication with the inlet of the centrifugal coolant passageway,
wherein the disk includes an interior circumferential surface defining the inlet of the centrifugal coolant passageway and an opposite exterior circumferential surface defining the outlet of the centrifugal coolant passageway;
wherein the interior circumferential surface of the disk cooperates with an exterior surface of the rotor shaft to define an annular coolant header in fluid communication with the outlet port of the axial coolant passageway and the inlet of the centrifugal coolant passageway.

2. The fluid-cooled axial flux motor of claim 1, wherein:
the axial coolant passageway includes a closed end opposite the inlet port; and
the outlet port extends perpendicularly from the rotational axis.

3. The fluid-cooled axial flux motor of claim 1, wherein the centrifugal coolant passageway defines a spiral curve from the interior circumferential surface to the exterior circumferential surface of the disk.

4. The fluid-cooled axial flux motor of claim 1, wherein the disk body further includes a plurality of concentric coolant channels in fluid communication with the centrifugal coolant passageway.

5. The fluid-cooled axial flux motor of claim 1, further comprising:
a plurality of magnets affixed in a predetermined arrangement on the interior face of the disk, wherein the centrifugal coolant passageway extends between an interface between the magnets and the interior face of the disk; and
a dam in slidable engagement with the plurality of magnets such that the dam provides a fluid tight seal between the centrifugal coolant passageway and the stator.

6. The fluid-cooled axial flux motor of claim 5, further comprising:
a motor housing containing the rotor and stator; and
a coolant distribution header having a distribution header inlet in fluid communication with the outlet of the centrifugal coolant passageway, and a coolant distribution header outlet in fluid communication with the stator, wherein the coolant distribution header is located at an upper portion of the motor housing with respect to a direction of gravity.

7. The fluid-cooled axial flux motor of claim 6, further comprising a coolant collection header having a collection header inlet in fluid communication with the stator and a collection header outlet, wherein the coolant collection header is located at a lower portion of the motor housing with respect to the direction of gravity.

8. The fluid-cooled axial flux motor of claim 1, wherein the disk comprises a laminated metallic strip having predetermined apertures defining radial coolant passageway.

9. A fluid-cooled axial flux motor, comprising:
a stator;
a rotor disposed adjacent the stator about a rotational axis, wherein the rotor comprises an annular disk having an interior face oriented toward the stator, an exterior face opposite the interior face, an interior circumferential surface, and an exterior circumferential surface opposite the interior circumferential surface;
a plurality of magnets affixed in a predetermined arrangement on the interior face of the annular disk; and
a rotor shaft extending along the rotational axis and rotationally fixed to the interior circumferential surface of the annular disk, the rotor shaft includes a axial coolant passageway having an inlet port, a closed end opposite the inlet port, and a plurality of outlet ports extending radially from the rotational axis;

wherein the rotor shaft includes an external shaft surface cooperating with the interior circumferential surface of the annular disk to define an annular coolant distribution header in fluid communication with the outlet ports of the axial coolant passageway.

10. The fluid-cooled axial flux motor of claim 9, wherein the rotor includes a first plurality of centrifugal coolant passageways extending through the annular disk between the interior circumferential surface and the exterior circumferential surface, wherein at least one of the first plurality of centrifugal coolant passageways includes an inlet in fluid communication with the annular coolant distribution header.

11. The fluid-cooled axial flux motor of claim 10, wherein the rotor includes a second plurality of centrifugal coolant passageways extending through the annular disk between the interior circumferential surface and the exterior circumferential surface at the interface between the interior face of the annular disk and the plurality of magnets, wherein at least one of the second plurality of centrifugal coolant passageways includes an inlet in fluid communication with the annular coolant distribution header.

12. The fluid-cooled axial flux motor of claim 11, further comprising:

a motor housing enclosing the rotor and stator; and a coolant distribution header disposed adjacent to an upper portion of the motor housing with respect to a direction of gravity, wherein the coolant distribution header includes an inlet in fluid communication with at least one of the first plurality of centrifugal coolant passageways and the second plurality of centrifugal coolant passageways, and an outlet in fluid communication with the stator.

13. The fluid-cooled axial flux motor of claim 12, further comprising a coolant collection header disposed adjacent to a lower portion of the motor housing with respect to the direction of gravity, wherein the coolant collection header includes an inlet in fluid communication with the stator, and a collection header outlet.

14. The fluid-cooled axial flux motor of claim 12, wherein the first plurality of centrifugal coolant passageways defines a spiral curve from the interior circumferential surface to the exterior circumferential surface.

15. The fluid-cooled axial flux motor of claim 12, wherein the annular disk further includes a plurality of concentric coolant channels in fluid communication with at least one of the first plurality of centrifugal coolant passageways and second plurality of centrifugal coolant passageways.

* * * * *